No. 777,514. PATENTED DEC. 13, 1904.
J. T. JENNINGS & T. T. TUTTLE.
MOISTURE PAD FOR HORSES' HOOFS.
APPLICATION FILED MAR. 14, 1904.
NO MODEL.
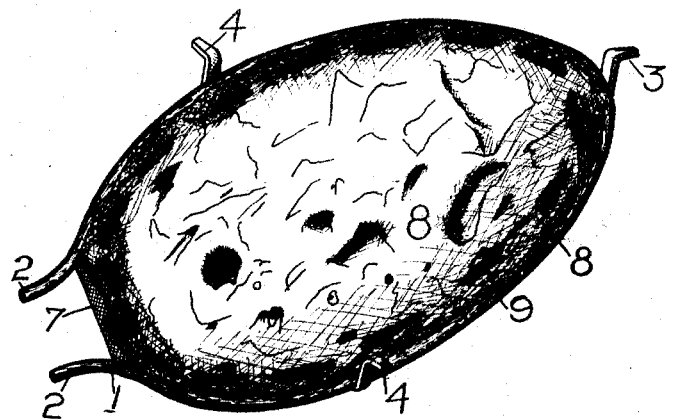
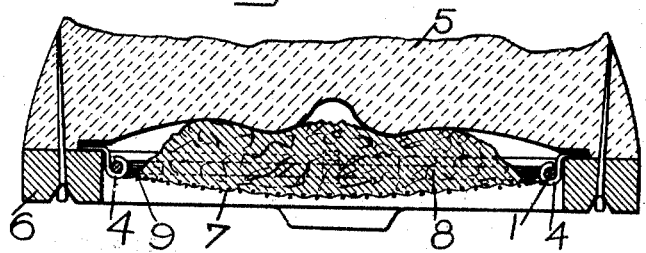
WITNESSES:
INVENTORS
J. T. Jennings
T. T. Tuttle
BY
F. M. Wright.
ATTORNEY No. 777,514. Patented December 13, 1904.

UNITED STATES PATENT OFFICE.

JOHN TRUMAN JENNINGS AND THOMAS T. TUTTLE, OF SAN MATEO, CALIFORNIA.

MOISTURE-PAD FOR HORSES' HOOFS.

SPECIFICATION forming part of Letters Patent No. 777,514, dated December 13, 1904.

Application filed March 14, 1904. Serial No. 197,983. (No model.)

*To all whom it may concern:*

Be it known that we, JOHN TRUMAN JENNINGS and THOMAS T. TUTTLE, citizens of the United States, residing at San Mateo, in the county of San Mateo and State of California, have invented certain new and useful Improvements in Moisture-Pads for Horses' Hoofs, of which the following is a specification.

Our invention relates to moisture-pads for horses' hoofs.

It is important to keep horses' hoofs moist, for otherwise they become inflamed and sore. It is a common custom to pack horses' hoofs with wet clay during the night and to remove it in the morning for the purpose of keeping them moist.

Our invention relates to an improved device which can be substituted for this wet-clay packing and which will be much more effective in its results.

Our invention therefore resides in the novel construction, combination, and arrangement of parts for the above ends hereinafter fully specified, and particularly pointed out in the claim.

In the accompanying drawings, Figure 1 is a perspective view of the device detached. Fig. 2 is a cross-sectional view of the same in position on a horse's hoof.

Referring to the drawings, 1 represents a spring-wire bent into horseshoe form, the ends 2 being extended to form finger-pieces by which the two ends can be pressed together for the purpose of inserting the device in place. Upon this spring-wire are secured hooks 3 4, one, 3, at the front or middle of the wire and the other two, 4, at the sides, somewhat to the rear. When the wire is compressed, the rear hooks 4 are in such a position that when the front hook 3 is inserted between the horse's hoof (shown at 5 in Fig. 2) and the shoe (shown at 6) the rear hooks can also be placed in such a position that when the spring-wire is released they will spring in between the hoof and the shoe and hold the device in place.

Upon the spring-wire is secured by its edge a horseshoe-shaped piece 7 of fabric, as common cloth, and upon said fabric is secured by stitches 9 a piece of sponge 8 of a suitable shape to fill the cavity in the hoof.

Before use the sponge is filled with water and the device is placed in the hoof. During the night-time the device keeps the hoof moist and contains more than sufficient water for that purpose. In the morning the devices are removed from the hoofs.

We claim—

A device of the character described, comprising a horseshoe-shaped spring-wire, hooks rigidly extending upwardly and outwardly therefrom at the middle and at the sides for engaging the upper side of the horse's shoe, a correspondingly-shaped piece of freely-flexible material secured to said wire along substantially the whole extent thereof and completely covering or inclosing the space within the wire, and moisture-absorbent material secured directly to and above said piece, substantially as described.

In witness whereof we have hereunto set our hands in the presence of two subscribing witnesses.

JOHN TRUMAN JENNINGS.
THOMAS T. TUTTLE.

Witnesses:
PAUL PINCKNEY,
C. M. MORSE.